UNITED STATES PATENT OFFICE.

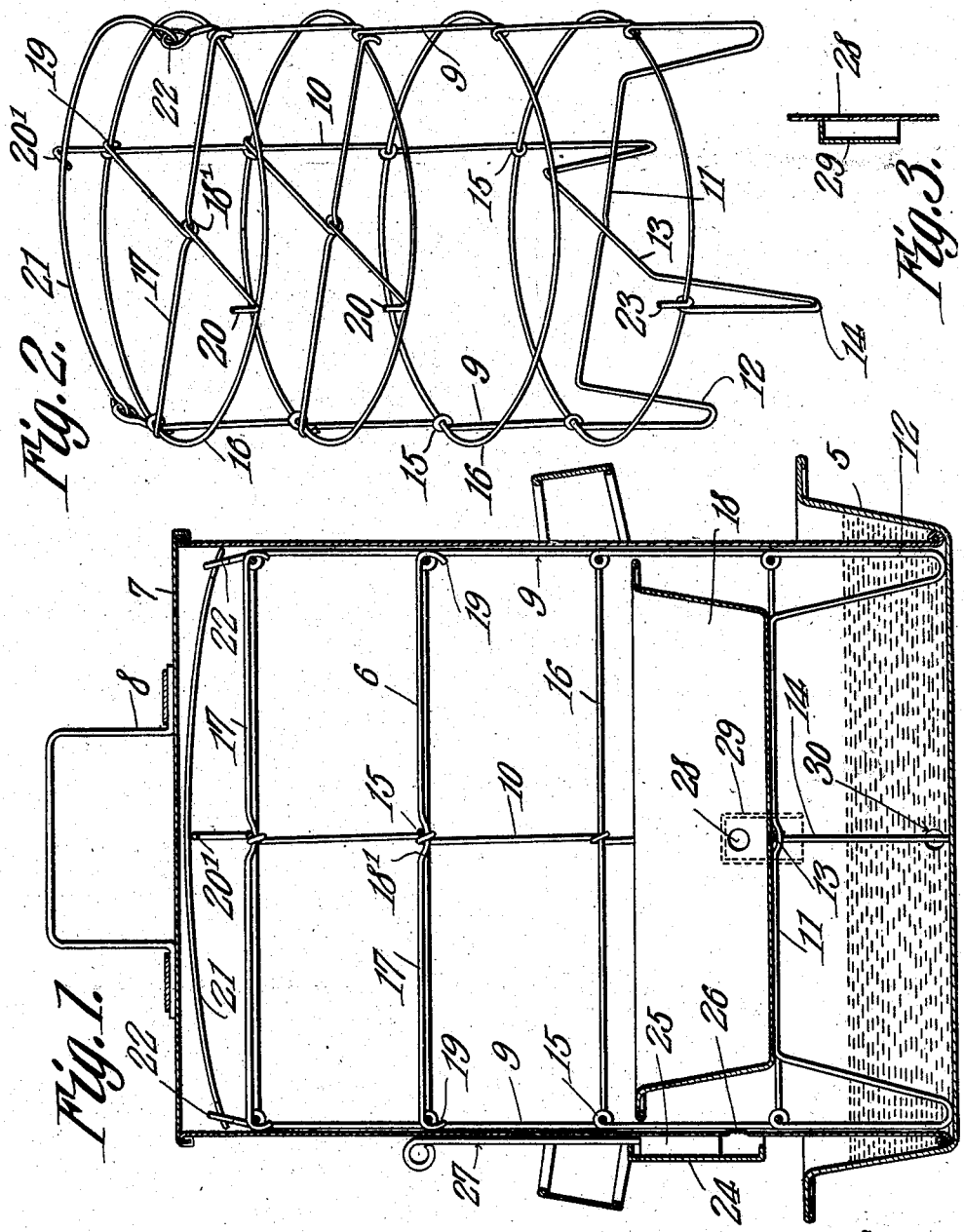

NIAL N. CHASE, OF PEORIA, ILLINOIS.

STEAM-COOKER.

No. 918,656.  Specification of Letters Patent.  Patented April 20, 1909.

Application filed September 16, 1908. Serial No. 453,298.

*To all whom it may concern:*

Be it known that I, NIAL N. CHASE, a citizen of the United States, residing at Peoria, in the county of Peoria and State of Illinois, have invented a new and useful Steam-Cooker, of which the following is a specification.

This invention relates to domestic boilers and more particularly to a steam cooker especially designed for steaming and cooking meats, poultry, vegetables and the like and for canning or preserving fruit.

The object of the invention is to provide a steam cooker including a skeleton frame having means for supporting a plurality of food containing trays or receptacles and provided with a dome or cover adapted to rest on the bottom of the fluid containing vessel and form a closure for the skeleton frame.

A further object is to provide the skeleton frame with a plurality of removable tray supporting racks each having a vertically disposed stop lip adapted to bear against and prevent accidental displacement of the trays.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification:—Figure 1 is a longitudinal sectional view of a steam cooker constructed in accordance with my invention. Fig. 2 is a perspective view of the tray supporting frame detached. Fig. 3 is a detail vertical sectional view of one of the steam ports of the cover.

Similar numerals of reference indicate corresponding parts in all of the figures of the drawings.

The improved steam cooker forming the subject matter of the present invention comprises a liquid containing vessel 5, a tray supporting frame 6, and a shell or cover 7, the latter being provided with a suitable handle 8 by means of which the cover may be readily positioned on or removed from the frame.

The skeleton frame is preferably formed of wire and includes spaced side members or uprights 9 and 10, the side members 9 being formed of a single strand of wire having its intermediate portion bent upwardly to produce a horizontally disposed arm 11 and depending feet 12 adapted to rest on the bottom of the vessel 5, as shown. The side member or upright 10 is also formed from a single wire strand having one end thereof bent upwardly to produce a horizontally disposed arm 13 which intersects the arm 11 and may be soldered or otherwise rigidly secured thereto, that portion of the wire at the opposite sides of the arm 13 being bent to produce supporting feet 14 similar in construction to the feet 12.

The wire strands forming the side members or standards 9 and 10 are bent to produce a plurality of spaced eyes or loops 15 adapted to receive suitable rings or hoops 16, which latter are threaded through the eyes 15 and are preferably soldered or otherwise rigidly secured to the side members so as to retain the several parts in assembled position.

Extending across and supported by the hoops 16 are racks 17 adapted to receive and support suitable food containing trays 18. The racks 17 are each formed of intersecting wires, one of which is provided with an off set or depression 18', while the other is coiled around said off set portion and soldered thereto, as shown. The terminals of the intersecting wires comprising the racks are bent to form depending hooks 19 adapted to engage the walls of the adjacent rings or hoops 16, one of the wires constituting the terminal of each rack being provided with a vertically disposed stop lip 20 arranged to bear against the adjacent tray, thereby to prevent accidental displacement of the latter when removing the skeleton frame from the liquid containing vessel.

One end of the wire forming the side member or standard 10 is extended vertically above the upper ring or loop 16 and thence bent inwardly to form a rest or support 20' for a handle or bail 21, the opposite end of the wire strand forming the side members 9 being extended vertically above the upper supporting ring or hoop and coiled to produce terminal ears 22 for the reception of the pivoted ends of the bail 21.

Attention is here called to the fact that that portion of the skeleton frame at the front of the latter and between the side members 9 is free and unobstructed so as to permit the ready insertion or removal of the trays 18. It will also be noted that one end of the wire strand constituting the side member or standard 10 is extended vertically above the lower supporting ring or hoop to form a stop lip 23 similar in construction to the stop lips 20.

Secured to the exterior walls of the cover 7 is a casing 24 having a vertically movable valve 25 slidably mounted therein and arranged to cover a vent opening 26 formed in the closure 7, said valve being operated by a rod or finger piece 27 secured to the upper end of the valve. Suitable auxiliary vent openings 28 are also preferably formed in the cover section 7 and each provided with a hood or guard 29 for deflecting the steam downwardly within the liquid containing vessel or pan 5. Formed in the lower edge of the cover 7 is an aperture 30 which acts as a signal and serves to notify the attendant that the water in the vessel 5 needs replenishing when the latter falls below a predetermined level, the water bubbling through the aperture 30 making sufficient noise to attract the attention of the attendant. The vent opening 26 is for the purpose of permitting the escape of air from within the cover 7 when positioning the same upon or removing the cover from the vessel 5, this valve being also used in some cases to regulate the escape of steam from the interior of the cover.

The racks 17 are detachably secured to the hoops or rings 16, the hooks 19 frictionally engaging the hoops so as to prevent accidental displacement of the racks.

When the cooker is used for cooking or steaming vegetables and the like the same are placed in the trays 18 and the latter positioned on the racks 17 after which the skeleton frame is placed in position on the bottom of the vessel 5 and the cover 7 placed over said skeleton frame.

When it is desired to cook poultry, hams or relatively large pieces of meat the intermediate racks are removed from the skeleton frame and the ham or chicken suspended from the top rack at the intersection of the cross wires, one of the trays 18 being placed in position on the intersected wires 11 and 13 to catch the drippings.

It will of course be understood that the skeleton frames may be made in different sizes and provided with any number of tray supporting racks without departing from the spirit of the invention.

Having thus described the invention what is claimed is:

1. A steam cooker including a liquid containing vessel, a skeleton frame disposed within the vessel and comprising spaced side members having intersecting arms and provided with spaced eyes, hoops extending through said eyes, racks supported on the hoops and comprising intersecting wires having terminal hooks adapted to engage the adjacent hoops, one of the wires of each rack being extended vertically to form a stop lip, and a cover fitting over the frame and resting on the bottom of the liquid containing vessel.

2. A steam cooker including a liquid containing vessel, a skeleton frame disposed within the vessel and comprising spaced side members having intersecting arms and provided with spaced eyes, hoops extending through said eyes, two of the side members being extended beyond the upper hoop and bent to produce terminal loops, and the third side member being also extended vertically above the upper hoop and thence bent inwardly to form a stop, a bail pivoted in the loops of the side members and arranged to bear against the said stop, tray supporting racks having means for engagement with the hoops, and a cover fitting over the frame and resting on the bottom of the liquid containing vessel.

3. A steam cooker including a liquid containing vessel, a skeleton frame disposed within the vessel and comprising spaced side members having intersecting arms and provided with depending feet, one of the side members being shorter than the others and provided with a vertical stop, there being spaced eyes formed in said side members, hoops threaded through the eyes, racks supported on the hoops and comprising intersecting wires having means for engagement with the adjacent hoops, one of the wires of each rack being bent upwardly to form a vertical stop, a bail pivotally connected with two of the side members, and a cover fitting over the supporting frame and resting on the bottom of the liquid containing vessel.

In testimony that I claim the foregoing as my own, I have hereto affixed my signature in the presence of two witnesses.

NIAL N. CHASE.

Witnesses:
  GEO. BRYAN,
  C. N. MIHIGAN.